(No Model.)
N. P. & J. W. LEHR.
FEED MECHANISM.
No. 294,739. Patented Mar. 4, 1884.
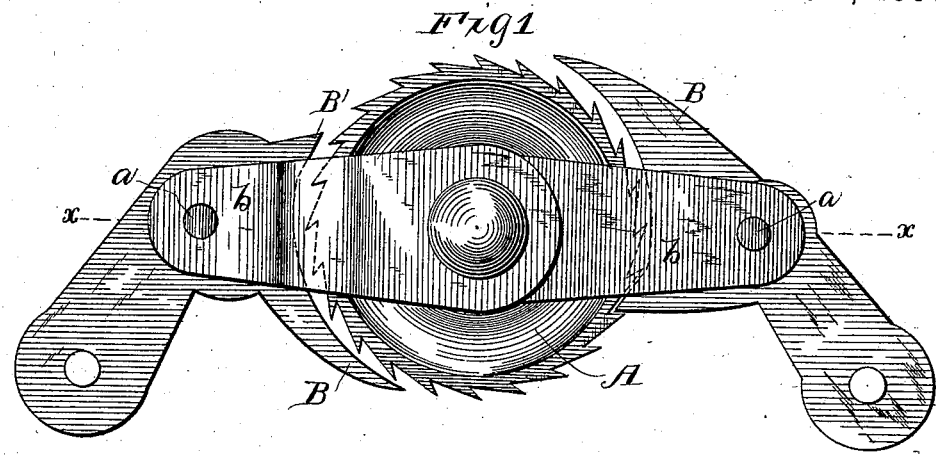
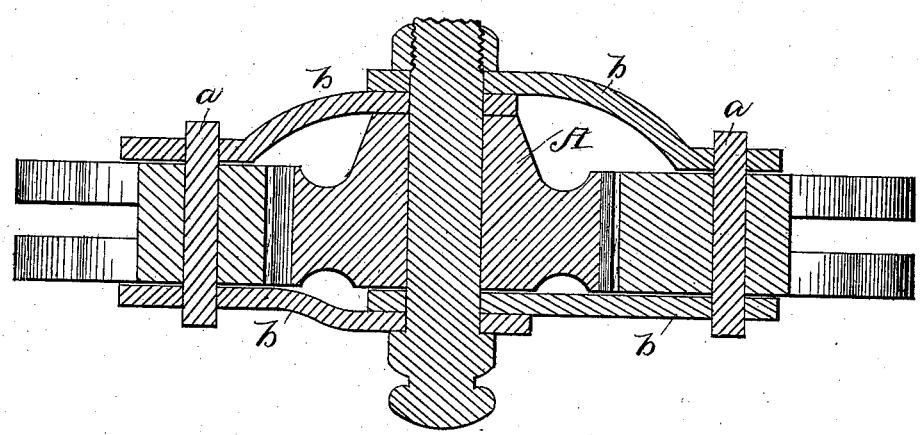
WITNESSES:
W. E. Bowen
Wm. M. Rheem
INVENTORS
Joseph W. Lehr
Nicholas P. Lehr
BY Myers & Co.
ATTORNEYS.

UNITED STATES PATENT OFFICE.

NICHOLOS P. LEHR AND JOSEPH W. LEHR, OF FREMONT, OHIO.

FEED MECHANISM.

SPECIFICATION forming part of Letters Patent No. 294,739, dated March 4, 1884.

Application filed January 12, 1884. (No model.)

*To all whom it may concern:*

Be it known that we, N. P. LEHR and J. W. LEHR, citizens of the United States of America, residing at Fremont, in the county of Sandusky and State of Ohio, have invented certain new and useful Improvements in Feed Mechanism, of which the following is a specification, reference being had therein to the accompanying drawings.

This invention pertains to improvements in feed mechanism for feed-cutters, or for use wherever it is desirable to transmit an intermittent rotary motion; and it consists of the detailed construction and combination of parts substantially as hereinafter fully set forth, and pointed out in the claim.

In the accompanying drawings, Figure 1 is a side elevation of our invention. Fig. 2 is a transverse section thereof.

In carrying out our invention we employ a ratchet or toothed wheel, A, which is designed to be fastened to the feeder-shaft of a feed-cutter, or to be applied in any other connection where an intermittent rotary motion is required.

B B are two angular pawl-levers or dogs, which are pivoted at their angles between and upon pivots, *a*, bearing in the outer ends of arms *b b*, fitted at their opposite ends upon the feed-shaft and upon both sides of the ratchet-wheel. The outer ends of the levers or dogs B are in practice connected to actuating mechanism not here shown. The levers or dogs B are each forked at their angles, one prong being formed into a beveled-ended or pointed tooth, B', which engages the ratchet, and the other prong being considerably longer than the other, and forming an arm which rests the ratchet when the tooth-prong is out of engagement therewith, thus affording a bearing for the lever when its tooth is not acting. The short prongs or teeth of the two dogs or lever project oppositely therefrom, which is also the case with the longer prongs or arms, whereby they are adapted to engage alternately with the ratchet-wheel when the levers or dogs are actuated, and thus impart an intermittent rotary motion to the feeder to give the desired feeding action to the feeder.

Having thus fully described our invention, what we claim, and desire to secure by Letters Patent, is—

In a feed mechanism, the combination, with the feeder-shaft having the ratchet, of the oppositely-acting dogs or pawls, each provided with a tooth and an arm at its angle, and pivoted between and at the outer ends of levers having their bearings on the feeder-shaft on the sides of the ratchet-wheel, substantially as described, and for the purpose set forth.

In testimony whereof we affix our signatures in presence of two witnesses.

NICHOLOS P. LEHR.
JOSEPH W. LEHR.

Witnesses:
JAMES H. FOWLER,
G. W. WELKER.